United States Patent Office 2,769,693
Patented Nov. 6, 1956

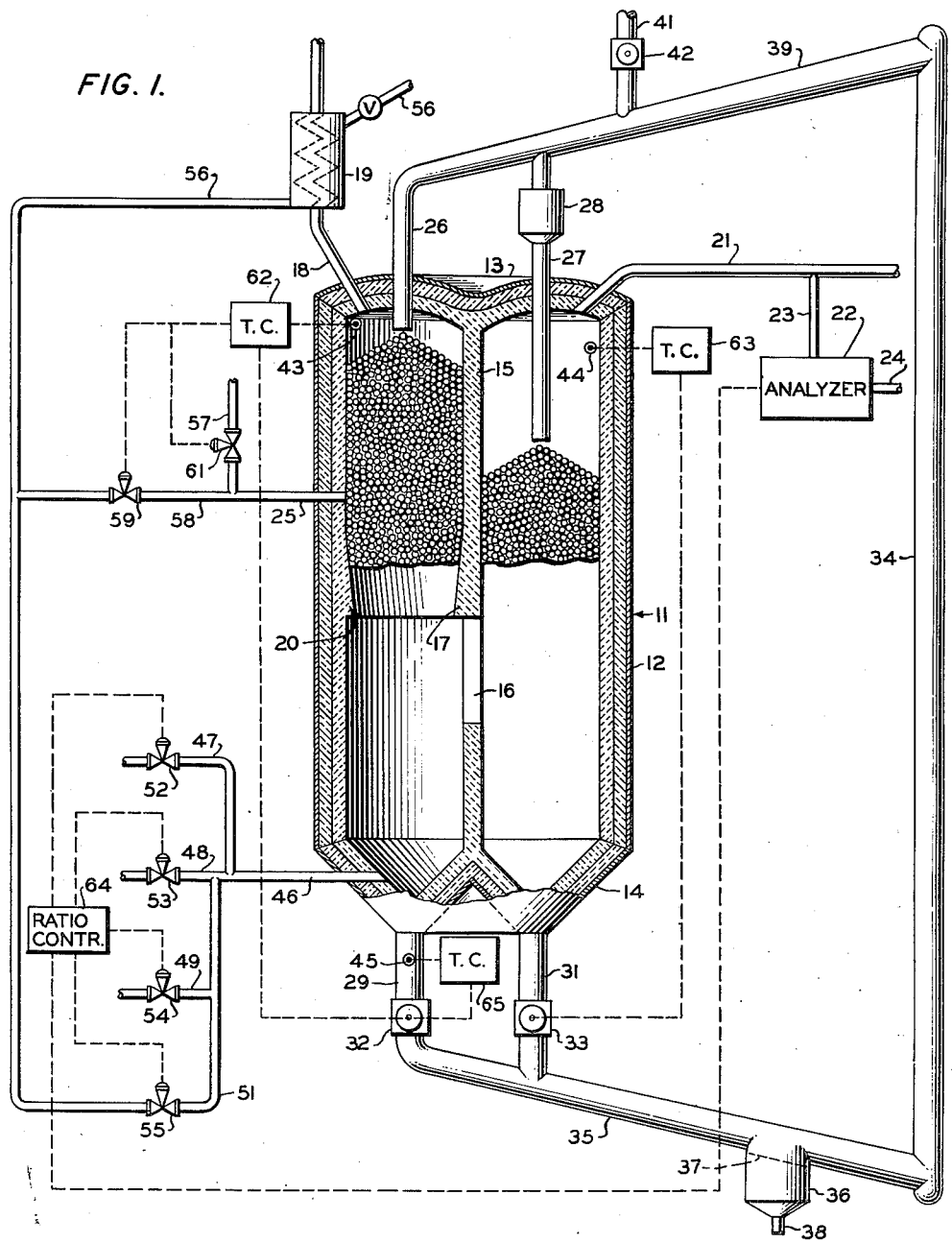

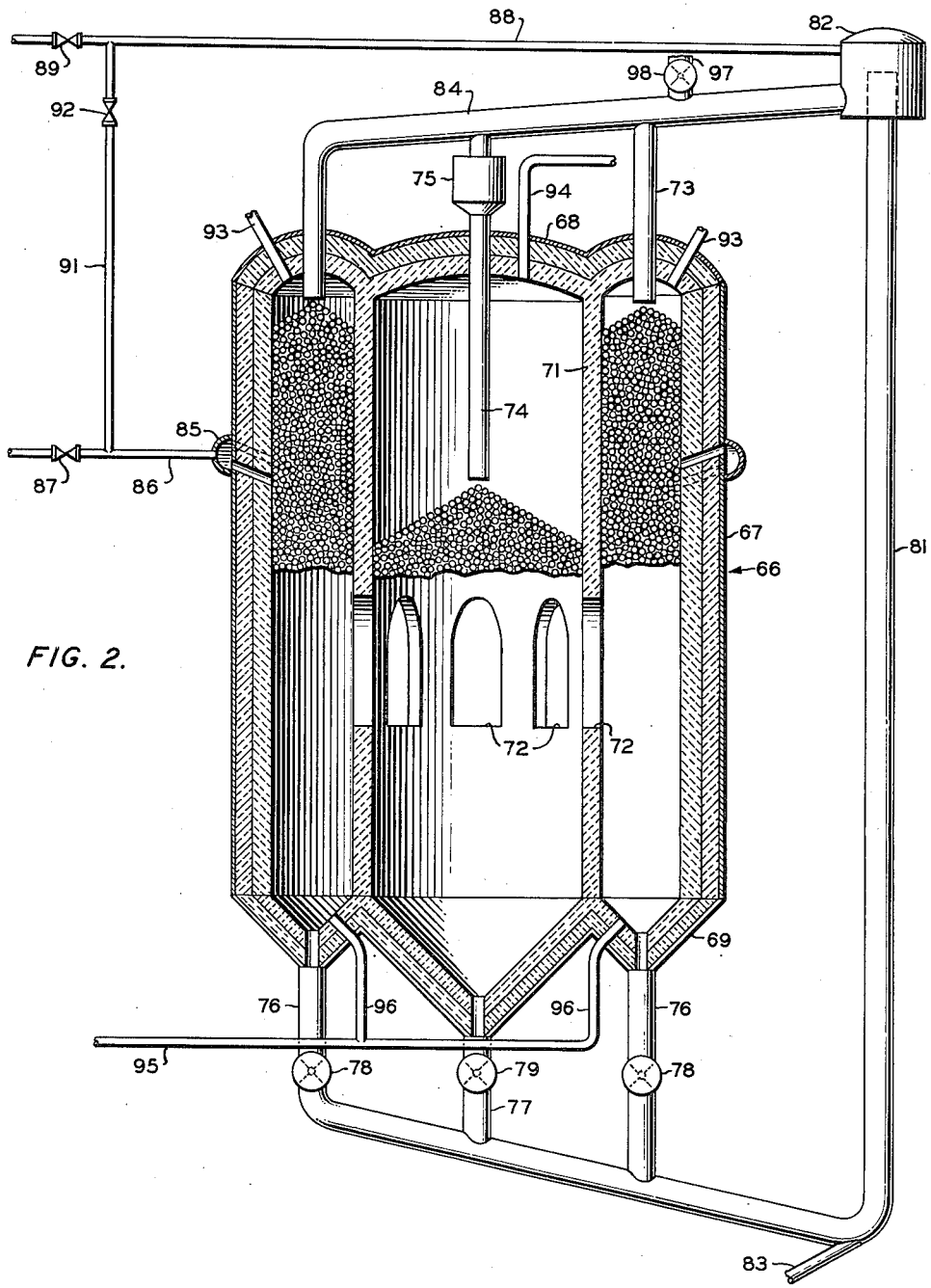

2,769,693

PEBBLE HEAT EXCHANGER

Louis C. Bearer, Bartlesville, Okla., assignor to Phillips Petroleum Company, a corporation of Delaware Application December 21, 1951, Serial No. 262,757

18 Claims. (Cl. 23—284)

This invention relates to pebble heat exchangers. In one of its more specific aspects, it relates to a single shell pebble heater apparatus. In another of its more specific aspects, it relates to pebble heater apparatus having an internal quench. In another of its more specific aspects, it relates to an improved method for producing gaseous products in processes requiring close temperature control. In another of its more specific aspects, it relates to a method for producing city gases by means of the water-gas shift reaction.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene, acetylene, and water-gas, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the entire length of the system, and are then conveyed to the top of the system to complete the cycle. Solid heat exchange material which is conventionally used in pebble heater apparatus is generally called "pebbles." The term "pebble" as used herein denotes any strong, solid material of flowable size and form which is suitable to carry large amounts of heat from the pebble heating zone to the gas heating zone without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between ¼-inch and ⅜-inch are preferred. Generally the pebbles must be formed of a refractory material which will withstand temperatures at least as high as the highest temperature attained in the pebble heating chamber. The pebbles must also be capable of withstanding temperature changes within the apparatus. Refractory material, such as metal alloys, ceramics, or other satisfactory material may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well at high temperatures, some withstanding temperatures up to 4000° F. Pebbles which are used may be either inert or catalytic as used in any selected process.

In carrying out a water-gas shift reaction for the preparation of city gas, it may be desirable to utilize coke pellets instead of the refractory metal or metal alloy pebbles designated above. Such coke pellets are utilized in one specific aspect of this invention.

In normal operation of conventional pebble heater apparatus, the pebbles are heated in one of the chambers (preferably the upper one) by direct heat exchange with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons such as ethane or propane, the pebble temperature in the reaction chamber is usually within the range of 1200° F. to 1800° F. For the production of acetylene by the pyrolysis of hydrocarbons, temperatures in the range of 1600° F. to 3000° F. are desirable. One disadvantage of conventional pebble heater apparatus is that the degree of temperature control after reaction of the feed is not sufficient in many instances to prevent overcracking of the products. Another disadvantage of conventional pebble heater apparatus is that it is very difficult to maintain the throat structures between pebble heater chamber and the reaction chamber. The high temperatures at which the apparatus operates places considerable thermal stress upon the pebble throats with the result that the throats tend to become fractured after very short periods of operation. I have devised a means and method whereby these disadvantages inherent in conventional pebble heater apparatus, are substantially obviated.

By at least one aspect of this invention, at least one of the following objects of the invention is attained. An object of this invention is to provide improved means for thermally treating or reacting gaseous materials. Another object of the invention is to provide improved means for converting carbon (coke or coal) granules to city gases by means of the water-gas reaction. Another object of the invention is to provide means for obtaining closer temperature control of the products resulting from a pyrolysis of hydrocarbons in pebble heater apparatus. Other and further objects of the invention will be apparent upon study of the accompanying disclosure.

Broadly speaking, this invention resides in an improvement in the structure of pebble heat exchange apparatus by forming that apparatus so as to provide a pebble heating section, a reaction section and a quench section within a single shell. The improvement comprises the provision of an upright partition member extending from the top to the bottom of the shell so as to divide that shell into two adjacent chamber sections. Gaseous material conduits are provided in the partition intermediate its ends so as to provide communication between the two chambers. Pebble flow controls are provided so as to make possible a close control of the pebble flow through the pebble heater apparatus in accordance with temperature conditions therein. Control of the feed to the apparatus may also be obtained in accordance with an analysis of the product stream.

Better understanding of the invention will be apparent upon study of the diagrammatic drawings in which Figure 1 is a vertical section of the pebble heat exchanger of this invention. Figure 2 is a vertical section of pebble heater apparatus embodying a preferred modification of this invention.

Referring particularly to the device shown in Figure 1 of the drawing, pebble heater apparatus 11 comprises a single upright shell 12 closed at its upper and lower ends by closure members 13 and 14, respectively. The chamber formed within shell 12 is divided into two sections by means of an upright partition member 15. Partition member 15 is provided with at least one gaseous material conduit 16 intermediate its ends, preferably in its central portion. In this specific modification of the invention a lip member 17 is provided as a portion of partition 15 so as to extend into one of the chambers formed within shell 12 and separated by partition member 15. A lip member 20 also extends into that chamber from the side wall. Gaseous effluent conduit 18 extends upwardly from the upper end portion of the chamber containing the extending lip 17 and preferably extends through indirect heat exchanger 19. Gaseous effluent conduit 21 extends from the upper end portion of the other chamber to a product collection zone, not shown. Analyzer 22 is connected to conduit 21 by means of conduit 23 and is provided with a gaseous effluent conduit 24 extending therefrom. Gaseous material inlet conduit 25 extends into the chamber containing lip member 17 at a point considerably above the bottom of that lip.

Pebble inlet conduit 26 extends into the upper end of the chamber containing lip members 17 and 20 and inlet conduit 27 extends into the upper end of the other chamber. Pebble surge chamber 28 is provided intermediate the ends of pebble conduit 27. Pebble outlet conduit 29 extends downwardly from the lower end of the chamber containing lip 17 and pebble outlet conduit 31 extends downwardly from the other chamber. Pebble feeder 32 is provided intermediate the ends of outlet conduit 29 and pebble feeder 33 is provided intermediate the ends of outlet conduit 31. Conduits 29 and 31 are connected at their downstream ends to the lower end of elevator 34 by means of conduit 35. Conduit 35 is provided with a separation chamber 36 having a grill or screen 37 in its upper side so as to form the floor in a section of conduit 35. Solid material outlet conduit 38 is provided in the lower end portion of separation chamber 36.

Elevator 34 is connected at its upper end to the upper ends of inlet conduits 26 and 27 by means of pebble conduit 39. Solid material inlet conduit 41, provided intermediate its ends with feeder 42, is connected to pebble conduit 39. Feeders 32, 33 and 42 may be any conventional type of pebble feeder such as a star valve, a gate valve, a rotatable table feeder, a vibratory feeder, or the like. A first temperature sensitive element 43 is provided in the upper end portion of the chamber containing lip members 17 and 20. Temperature sensitive element 44 is provided in the upper end portion of the other chamber. Temperature sensitive element 45 is provided in pebble outlet conduit 29. These temperature sensitive elements may be of any conventional type such as thermocouples or the like.

Gaseous material inlet conduit 46 extends into the lower end portion of the chamber containing lip members 17 and 20. Conduit 46 is branched, having inlets 47, 48, 49 and 51. Valves 52, 53, 54 and 55 are provided within the respective inlets. Feed conduit 56 is connected through indirect heat exchanger 19 and is connected to inlet 51 by means of valve 55. Gaseous material inlet conduit 25 is also branched having inlets 57 and 58. Inlet 58 is connected to conduit 56 through valve 59. Valve 61 is provided intermediate the ends of inlet 57. Temperature controller 62 is operatively connected to temperature sensitive element 43 and to valves 59 and 61. Temperature controller 62 is also operatively connected to pebble flow controller 32.

Temperature controller 63 is operatively connected to temperature sensitive element 44 and is connected to pebble flow controller 33 in pebble outlet conduit 31. Temperature controller 65 is operatively connected to temperature sensitive element 45 and is connected to pebble flow controller 32. Analyzer 22 is operatively connected to ratio controller 64 which is in turn operatively connected to valve members 52, 53, 54 and 55.

Flow ratio controller 64 may be manually set so as to obtain the desired proportion of the various feeds within the reactor despite the requirement for volume charge imposed by the signal from analyzer 22.

Referring particularly to the device shown in Figure 2 of the drawings, pebble heat exchanger 66 comprises an upright elongated shell 67 closed at its upper and lower ends by closure members 68 and 69, respectively. Refractory partition 71 is positioned coaxially with shell 67, being of smaller diameter than shell 67 and extending from the bottom closure 69 upwardly to closure member 68 so as to form an annular chamber between shell 67 and partition 71. Conduits 72 are provided in partition 71 intermediate its ends and preferably about midway between its upper and lower ends. Pebble inlet conduits 73 extend into the upper end portion of the annular chamber and pebble inlet conduit 74 extends into the upper end portion of the chamber formed within partition member 71. Pebble surge chamber 75 is provided intermediate the ends of pebble inlet conduit 74. A plurality of pebble outlet conduits 76 extend downwardly from the annular chamber and pebble outlet conduit 77 extends downwardly from the chamber formed within partition 71. Pebble feeders 78 are provided intermediate the ends of conduits 76 and pebble feeder 79 is provided intermediate the ends of pebble conduit 77. Elevator 81 is connected to the lower ends of pebble outlet conduits 76 and 77 and extends upwardly into separator chamber 82. A lift-gas inlet conduit 83 is provided in the lower end of elevator 81. The upper ends of pebble inlet conduits 73 and 74 are connected to the lower end portion of separator chamber 82 by pebble conduit 84.

A gaseous material inlet, preferably in the form of a header member communicates through shell 67 with the annular chamber at a point considerably above the level of conduits 72. That inlet header, designated by numeral 85, is connected to a gaseous material source by means of conduit 86 having valve 87 provided therein. Gaseous effluent conduit 88 extends from the upper end portion of separator chamber 82 and is provided with valve 89 therein. Conduit 91 extends between conduit 88 at a point upstream of valve 89 and conduit 86 at a point downstream of valve 87. Valve 92 is provided intermediate the ends of conduit 91. Gaseous effluent conduits 93 extend from the upper end portion of the annular chamber and gaseous effluent conduit 94 extends from the chamber formed within partition 71. Gaseous material inlet conduit 95 is connected to the lower end portion of the annular chamber by means of conduits 96. Pebble inlet conduit 97 is connected to pebble conduit 84 and is provided with pebble feeder 98 intermediate its ends.

The temperature controllers used in this invention can be any of the many such controllers conventionally used in industry. Exemplary of such devices is the one described by Bailey et al. in U. S. Patent 2,447,306. The pebble flow controllers can be either star valves, gate valves, rotating table feeders, vibratory feeders, or the like.

The devices of this invention may be used in any of the processes for pyrolysis of hydrocarbons requiring a sharp control of product temperatures. One such process involves the cracking of hydrocarbon gases which are predominantly in the $C_3$ and $C_4$ range to form water-gas for commercial gas systems. When liquefied petroleum gas is converted to water-gas for commercial gas systems, it is economically desirable to waste as little of the products of the reaction as possible because of the relatively high cost of that gas. In conventional pyrolysis of hydrocarbon gases which are predominantly in the $C_3$ and $C_4$ range, temperatures which are ordinarily used are too low to produce a gas of the low heating value usually employed in established domestic gas systems. Such commercial gas systems usually require a gas having a heating value of between about 500 and 700 B. t. u./cubic foot and a relatively low specific gravity, such as below about 0.5 as compared to a value of 1.0 for air. As far as is known, conventional propane cracking procedures result in a product gas having a B. t. u. value per cubic foot of at least about 775 and a specific gravity of at least 0.386 as compared to a value of 1.0 for air. In order to produce a low specific gravity gas of the required B. t. u. rating, it is necessary to operate at sufficiently high temperatures to thoroughly crack and reform the primary decomposition products. Resulting products can be blended with other gaseous material so as to obtain a fuel of the desired B. t. u. and specific gravity. Considerably greater amounts of carbon are deposited on the solid materials at the higher temperatures than at the lower temperatures. In such a process, it is apparent that the recovery of all of the products of such a reaction is highly desirable. By the process of this invention the carbon which is formed during the cracking operation is converted to water-gas in a second pass through the system. Tars which are formed are deposited on the pebbles in a quench section and are converted to coke for use in the system.

The water-gas reaction is obtained by passing stream over coke which has been heated to incandescence but to a temperature below the ash fusion point. The apparatus described above is quite useful in the production of water-gas from either gaseous hydrocarbons or from carbon (coke or coal) granules. In the process for the production of water-gas in the apparatus of this invention, coke particles may be utilized as the gravitating pebble mass or one of the other pebbles described above may be used.

When gaseous hydrocarbons are cracked for this purpose, carbon is laid down upon the surface of those pebbles and while at a high temperature the coke-covered pebbles are contacted with steam and/or air to convert some of the carbon to CO and $CO_2$. Substantially the same procedure is used when utilizing coke particles. The following reactions take place upon passing steam over carbon at various temperature levels.

(1) $C+H_2O \rightarrow CO+H_2$
(2) $C+2H_2O \rightarrow CO_2+2H_2$
(3) $CO+H_2O \rightarrow CO_2+H_2$
(4) $CO_2+C \rightarrow 2CO$ When steam is present during the thermal cracking of the hydrocarbon material, the above reactions are important along with reactions of hydrocarbons and steam. The reactions of methane and steam may be represented as follows:

(5) $CH_4+H_2O \rightarrow CO+3H_2$
(6) $CH_4+2H_2O \rightarrow CO_2+4H_2$

Although the reaction (1) takes place below 1650° F., the velocity of the reaction at such temperatures is quite low. At temperatures above about 1650° F., however, the velocity of the reaction is relatively rapid. The velocity of reaction (2) is rapid as compared to reaction (1) up to a temperature of 1650° F., but above this temperature the reaction rates of (1) and (2) are about equal. The velocity of reaction (4) is more than twice that of reaction (1) at temperature above 1650° F.

In the operation of the device shown as Figure 1 of the drawings, carbon or other pebbles are introduced into the system through inlet conduit 41 and feeder 42. The pebbles gravitate through conduit 39 and inlet conduits 26 and 27 into the two chambers formed within shell 12 forming contiguous gravitating masses therein. Flow through the two chambers is controlled by pebble flow controllers 32 and 33 in outlet conduits 29 and 31, respectively. Pebble conduit 27 extends downwardly to a lower level in its chamber than does conduit 26. For that reason the level of solid material within the chamber connected to conduit 27 is considerably lower than that in the other chamber section. The solid material bed extends downwardly from a point above the level of conduits 16 to pebble feeder 33 in outlet conduit 31. Fuel is introduced through conduit 57 to inlet 25 for start-up of the system or operation with refractory pebbles and free oxygen in the form of air and/or oxygen is introduced into the one chamber through conduit 58 and inlet conduit 25. The pebbles are heated or the coke is oxidized to such an extent that it is heated to incandescence but only to a temperature below the ash fusion temperature. If pebbles other than coke are used, a gaseous fuel or hot gaseous material is introduced into the chamber as pointed out above. The fuel is burned in the presence of the pebbles. Hot gaseous heat exchange material passes upwardly through the contiguous pebble mass and is removed from the upper portion of the chamber through effluent outlet conduit 18 and is passed in direct heat exchange with a stream of air so as to heat that material which is then used as a portion of the feed either to the heating section or to the reaction section or both. A hydrocarbon feed such as ethane and/or propane is introduced through conduit 47. Steam is introduced through conduit 48. Oxygen is introduced through conduit 49 and a limit opening valve 54 into inlet conduit 46 and thus into the lower portion of the reaction section within shell 12. Air is introduced through conduit 51 so as to augment the supply of free oxygen when desired.

The coke particles which are heated in the heating section above the reaction section gravitate through the reaction section in direct heat exchange with the gaseous feed to the reaction section. The hydrocarbons and the carbon are converted by means of the water-gas reaction and resulting products take the path of least resistance from the reaction zone. The path of least resistance is in the apparatus of this invention through conduit 16 and the mass of pebbles gravitating from conduit 27 through the quench section of the system. Considerably less pressure drop is encountered through the pebble mass in the quench section than is encountered in the heating section for the reason that the pebble bed in the quench section above the level of conduit 16 is of considerably less thickness than that in the heating section and because of the back pressure of the gases introduced at inlet conduit 25. The water-gas shift reaction takes place until finally quenched by the cool pebbles within the quench section.

The resulting reaction products are removed from the upper portion of the quench chamber through effluent outlet conduit 21 and are passed to a product collection zone not shown. A portion of the product stream is withdrawn to analyzer 22 and the materials are analyzed thereby. Valve 52, 53, 54 and 55 are controlled in accordance with the analysis of the product stream and the predetermined flow ratio imposed by ratio controller 64 so as to maintain a proper flow of reactant materials into the lower portion of the reaction zone.

Temperature sensitive element 44 is contacted by the gaseous effluent leaving the quench section and a signal is transmitted from that temperature sensitive element to temperature controller 63. If the gaseous effluent is too hot, temperature controller 63 operates so as to increase the flow of pebbles through feeder 33 so as to increase the rate of pebble flow and concomitant cooling and if too cool, to decrease the flow of pebbles. If the stack gases from the pebble heating section are too hot, that fact is communicated by means of temperature sensitive element 43 to temperature controller 62. Temperature controller 62 operates to control the flow of oxygen and air or fuel or hot gas into inlet 25 through conduits 57 and 58 by actuating valves 61 and 59, respectively. If the stack gases are too hot, the amount of oxygen and air or other gaseous material is materially decreased so as to maintain the pebbles at a lower temperature. Temperature controller 62 also actuates feeder 32 so as to increase the flow of pebbles through conduit 29 when the temperature of the stack gases is too high or to decrease the flow of pebbles through that feeder when the temperature of the stack gases is too low.

Temperature controller 65 on outlet conduit 29 is sensitive to the temperature of the gravitating solids in that conduit and if the pebbles leaving the chamber are too hot, temperature controller 65 which is operatively connected to temperature sensitive element 45 operates to decrease the pebble feed rate and when the pebbles are too cool, to increase the rate of pebble flow through feeder 32. Pebbles which are removed from the lower end of the chambers formed within shell 12 gravitate through conduit 35 over grid or screen 37 and ash is separated from the pebbles and is removed from chamber 36 through outlet conduit 38. The pebbles are elevated to the upper end of the system through elevator 34 and conduit 39.

While temperatures within the range of 1650° F. to 2500° F. are required in the reaction zone for the water-gas reaction, the preferred range of temperature in which the process operates most efficiently is within the range of 1900° F. to 2400° F. Temperatures of about 1750° F. to 2900° F. in the pebble heating zone will result in the desired temperature in the reaction zone. That temperature may be lowered, however, as air is introduced into the system.

In the operation of the device shown in Figure 2 of the drawings, the steps are much the same as those described in the description of the device of Figure 1. The solid heat exchange material is introduced into the system through inlet conduit 97 and feeder 98. The solid material gravitates into an annular heating zone and downwardly through a reaction zone. A portion of the solid heat exchange material is fed through pebble surge chamber 75 and conduit 74 into a quench zone formed within partition 71. The solid materials gravitate through feeders 78 and 79 and are entrained in a gaseous lift-medium which is suitable as the oxidizing or heating medium for introduction into the pebble heating zone. The solid heat exchange material is lifted by entrainment in the lift-gas to separator chamber 82, wherein the solid heat exchange material and the lift-gas are separated. The lift-gas which has been preheated in the elevating step is removed from separator chamber 82 through conduit 88. This gas can either be vented through valve 89 or passed to inlet means 85 through valve 92, conduit 91 and conduit 86. If additional air or other heating material is desired, that material can be introduced through valve 87 and conduit 86 into the heating section. Reactant materials are introduced into the lower portion of the annular chamber through conduits 95 and 96. The reaction and quenching steps take place in the manner described in connection with Figure 1.

The various automatic features described in connection with Figure 1 may also be used in connection with Figure 2. Although partition 71 and shell 67 have not been shown as having lips extending into the annular chamber, it is within the scope of this invention to so modify those members or to so modify partition member 15 and shell 12 to omit extended lips 17 and 20. The purpose of providing those lips is to increase the pressure drop and thus discourage the flow of reaction products into the heating section.

Other and further modifications will be apparent to those skilled in the art. Such modifications are believed to be within the spirit and scope of this invention.

I claim:

1. Improved pebble heater apparatus comprising in combination a closed, upright, elongated shell; an upright partition within and extending from the bottom to the top of said shell so as to divide the space within said shell into a first chamber on one side of said partition and a second chamber on the other side; gaseous material conduits intermediate the ends of said partition and extending between the two chambers; separate pebble inlet conduit means in the upper end of each chamber, the delivery end of the conduit in said second chamber being at a lower level than the delivery end of the conduit in said first chamber; pebble outlet means in the bottom of each chamber; elevator means connected at its lower end to said pebble outlet means and at its upper end to said pebble inlet means; gaseous material inlet means in the lower end of said first chamber formed within said shell; separate gaseous effluent conduit means extending from the upper end portion of each chamber; and gaseous material inlet means in said first chamber above the level of said gaseous material conduits in said partition.

2. The pebble heater apparatus of claim 1 wherein said shell and partition are extended inwardly into said first chamber immediately above said gaseous material conduits in said partition so as to form a restricted section in said first chamber.

3. The pebble heater apparatus of claim 1 wherein a pebble surge chamber is provided in said pebble inlet means in said second chamber.

4. The pebble heater apparatus of claim 1 wherein a pebble flow controller is provided in the pebble outlet means from said second chamber; a first temperature responsive element is provided in the upper end portion of said second chamber; and a first temperature controller is operatively connected to said first temperature responsive element and to said pebble flow controller.

5. The apparatus of claim 4 including a second pebble flow controller in the pebble outlet means from said first chamber; a second temperature responsive element in the upper end portion of said first chamber; a second temperature controller operatively connected to said second temperature responsive element and to said second pebble flow controller; a third temperature responsive element in the pebble outlet means from said first chamber; and a third temperature controller operatively connected to said third temperature sensitive element and to said second pebble flow controller.

6. The pebble heater apparatus of claim 1 wherein a pebble flow controller is provided in the pebble outlet means from said first chamber; a temperature responsive element is provided in the upper end portion of said first chamber; and a temperature controller is operatively connected to said temperature responsive element and to said pebble flow controller.

7. The pebble heater apparatus of claim 1 wherein a temperature responsive element is provided in the pebble outlet means from said first chamber; and a temperature controller is operatively connected to said temperature sensitive element and to said pebble flow controller.

8. The pebble heater apparatus of claim 1 wherein a gas analyzer is operatively connected to the gaseous effluent conduit means extending from said second chamber; flow control means are provided in the gaseous material inlet means in the lower end of said first chamber; and a flow ratio controller is operatively connected to said gas analyzer and to said flow control means.

9. The pebble heater apparatus of claim 1 wherein a temperature responsive element is provided in the upper end portion of said first chamber; flow control means is provided in the gaseous material inlet means intermediate the ends of said first chamber; and the temperature control means is operatively connected to said temperature responsive element and to said flow control means.

10. The pebble heater apparatus of claim 1 within an indirect heat exchanger is provided in the gaseous effluent conduit means extending from said first chamber; and a feed gas conduit is connected to said indirect heat exchanger and to said gaseous material inlet means in the lower end of said first chamber.

11. The apparatus of claim 1 in which the pebble inlet means in each chamber comprises an axial conduit, the one in said second chamber extended into the chamber a substantially greater distance than the pebble inlet conduit in said first chamber.

12. The pebble heater apparatus of claim 1 wherein said partition is ring-like but is of considerably smaller diameter than said shell, forming a first annular chamber therebetween and a second axial chamber within said partition.

13. The apparatus of claim 12 in which the delivery end of the pebble inlet means in said second chamber is at a substantially lower level than the delivery end of the pebble inlet conduit in said first chamber.

14. The pebble heater apparatus of claim 12 wherein said elevator is connected to said pebble outlet means from each chamber; a gaseous material inlet conduit is provided in the lower end portion of said elevator; a separator chamber is connected to the upper end portion of said elevator, said separator chamber being connected at its lower end to said pebble inlet means; and gaseous effluent conduit means in the upper end portion of said separator chamber.

15. The pebble heater apparatus of claim 14 wherein said gaseous effluent conduit means from said separator chamber is connected to the gaseous material inlet means intermediate the ends of said first chamber.

16. A pebble heat exchanger comprising in combination a closed upright shell; a partition connecting the top and bottom of said shell so as to form a first upright chamber on one side of said partition and a second upright chamber on the other side opposite said first chamber; conduit means in said partition intermediate its ends connecting said chambers as the sole gaseous inlet means to said second chamber; a separate pebble inlet means leading into the upper end of each chamber; a separate pebble outlet means leading from the lower end of each chamber; means for transferring pebbles from said pebble outlet means from each chamber to said pebble inlet means to each chamber; separate gaseous outlet means from the upper section of each chamber; fluid inlet means in said first chamber above the level of the conduit means in said partition; and fluid inlet means in a lower section of said first chamber.

17. A pebble heat exchanger comprising in combination a closed upright shell; a partition connecting the top and bottom of said shell so as to form a first upright chamber on one side of said partition and a second upright chamber on the other side opposite said first chamber; conduit means in said partition intermediate its ends connecting said chambers as the sole passageway between said first and second chambers within said shell; a separate pebble inlet means leading into the upper end of each chamber; a separate pebble outlet means leading from the lower end of each chamber; means for transferring pebbles from said pebble outlet means from each chamber to said pebble inlet means to each chamber; a separate gaseous outlet means from the upper section of each chamber; fluid inlet means in said first chamber above the level of the conduit means in said partition; and fluid inlet means in a lower section of said first chamber.

18. The heat exchanger of claim 16 wherein the level of the delivery end of the pebble inlet means in said second chamber is substantially lower than that in said first chamber.

References Cited in the file of this patent

UNITED STATES PATENTS

| | | |
|---|---|---|
| 2,089,957 | Harris et al. | Aug. 17, 1937 |
| 2,417,049 | Bailey et al. | Mar. 11, 1947 |
| 2,432,520 | Ferro | Dec. 16, 1947 |
| 2,432,872 | Ferro et al. | Dec. 16, 1947 |
| 2,432,873 | Ferro et al. | Dec. 16, 1947 |
| 2,503,788 | White | Apr. 11, 1950 |
| 2,519,340 | Bailey | Aug. 22, 1950 |
| 2,530,274 | Weber | Nov. 14, 1950 |
| 2,545,162 | Muly et al. | Mar. 13, 1951 |
| 2,552,063 | Robinson | May 8, 1951 |
| 2,561,419 | Schutte | July 24, 1951 |
| 2,590,869 | Keeling | Apr. 1, 1952 |
| 2,635,990 | Goins | Apr. 21, 1953 |